United States Patent
Olson

(10) Patent No.: US 9,789,742 B2
(45) Date of Patent: Oct. 17, 2017

(54) RING LATCH FOR PINTLE HITCH

(71) Applicant: POWER PIN INC., Fort Qu'Appelle, Saskatchewan (CA)

(72) Inventor: Brian R. Olson, Fort Qu'Appelle (CA)

(73) Assignee: POWER PIN INC., Saskatchewan (CA)

( * ) Notice: Subject to any disclaimer, the term of this patent is extended or adjusted under 35 U.S.C. 154(b) by 0 days.

(21) Appl. No.: 15/102,399

(22) PCT Filed: Nov. 20, 2014

(86) PCT No.: PCT/CA2014/000838
§ 371 (c)(1),
(2) Date: Jun. 7, 2016

(87) PCT Pub. No.: WO2015/089627
PCT Pub. Date: Jun. 25, 2015

(65) Prior Publication Data
US 2017/0021685 A1 Jan. 26, 2017

(30) Foreign Application Priority Data
Dec. 17, 2013 (CA) .................................. 2836683

(51) Int. Cl.
*B60D 1/28* (2006.01)
*B60D 1/02* (2006.01)
(Continued)

(52) U.S. Cl.
CPC ................. *B60D 1/28* (2013.01); *B60D 1/02* (2013.01); *B60D 1/04* (2013.01); *B60D 1/30* (2013.01); *B60D 1/36* (2013.01); *B60D 1/66* (2013.01)

(58) Field of Classification Search
CPC .......... A01B 59/006; B60D 1/04; B60D 1/02; B60D 1/28; B60D 1/30; E05C 19/10
See application file for complete search history.

(56) References Cited

U.S. PATENT DOCUMENTS

| 848,603 | A | * | 3/1907 | Read | ....................... | F16B 45/02 |
| | | | | | | 24/598.4 |
| 1,375,266 | A | * | 4/1921 | Weber | ..................... | B60D 1/04 |
| | | | | | | 280/510 |

(Continued)

FOREIGN PATENT DOCUMENTS

| CA | 2779051 A1 | 3/2012 |
| CA | 2793332 A1 | 3/2014 |

(Continued)

*Primary Examiner* — Joseph Rocca
*Assistant Examiner* — Daniel Yeagley
(74) *Attorney, Agent, or Firm* — King & Schickli, PLLC

(57) ABSTRACT

A pintle hitch apparatus has a base adapted at a forward end thereof for attachment to the towing vehicle. A hook member is attached to a rear end of the base and forms a cradle between the base and an upward oriented male portion of the hook member, the cradle configured to support the hitch ring member in a ring location. A latch member is pivotally attached to the base about a horizontal pivot axis such that the latch member can pivot from a closed position, where a rear portion of the latch member extends over the cradle above the ring location, to an open position where the rear end of the latch member is forward of the cradle. The latch member is weighted such that the latch member falls to the closed position when the latch member is in the open position.

14 Claims, 3 Drawing Sheets

(51) Int. Cl.
  *B60D 1/30* (2006.01)
  *B60D 1/04* (2006.01)
  *B60D 1/36* (2006.01)
  *B60D 1/66* (2006.01)

(56) References Cited

U.S. PATENT DOCUMENTS

| | | | | |
|---|---|---|---|---|
| 1,379,133 A * | 5/1921 | Speece | ............. | B60D 1/04 24/599.9 |
| 1,411,230 A * | 3/1922 | Weber | ............. | B60D 1/04 280/504 |
| 1,891,711 A * | 12/1932 | Himmelberger | ......... | B60D 1/04 280/498 |
| 2,124,839 A * | 7/1938 | Weiss | ............. | B60D 1/04 280/508 |
| 2,386,053 A * | 10/1945 | McElhinney | ............ | B60D 1/04 280/504 |
| 2,426,099 A * | 8/1947 | Hershowitz | ............. | B60D 1/04 24/598.5 |
| 2,470,706 A * | 5/1949 | Larson | ............. | E05C 19/10 24/599.1 |
| 2,491,143 A * | 12/1949 | Weiss | ............. | B60D 1/04 24/599.7 |
| 3,385,611 A * | 5/1968 | Silver | ............. | B60D 1/06 280/504 |
| 3,738,133 A * | 6/1973 | Newlon | ............. | E05C 19/10 292/210 |
| 3,827,724 A * | 8/1974 | Ackley | ............. | A01B 59/042 280/479.1 |
| 3,963,266 A | 6/1976 | Thelin | | |
| 4,568,098 A * | 2/1986 | Landry, Jr. | ............. | B60D 1/07 280/416.1 |
| 4,844,498 A | 7/1989 | Kerins | | |
| 5,312,128 A | 5/1994 | Blacklaw | | |
| 5,332,250 A | 7/1994 | Thorwall | | |
| 5,725,229 A | 3/1998 | McWethy | | |
| 6,139,043 A | 10/2000 | Gries | | |
| 6,889,995 B2 * | 5/2005 | Staggs | ............. | B60D 1/06 280/507 |
| 7,055,845 B1 * | 6/2006 | Putnam | ............. | B60D 1/46 280/490.1 |
| 8,276,931 B2 * | 10/2012 | DeKarske | ............. | B60D 1/06 280/507 |

FOREIGN PATENT DOCUMENTS

| | | | | |
|---|---|---|---|---|
| DE | 2243974 A1 * | 3/1974 | ............. | B60D 1/04 |
| DE | 10151382 A1 | 4/2003 | | |
| FR | 0450242 A1 * | 10/1991 | ............. | B60D 1/04 |
| GB | 2429195 A | 2/2007 | | |

* cited by examiner

RING LATCH FOR PINTLE HITCH

This invention is in the field of hitches for connecting a trailer or like towed vehicle to a towing vehicle, and in particular a hitch apparatus for securing the ring of a ring and pintle hitch to the pintle hitch.

BACKGROUND

Connecting mechanisms for towed vehicles take a variety of forms, such as clevis and tongue mechanisms, ball and socket mechanisms, pintle hook and ring mechanisms, and the like.

Clevis and tongue mechanisms require a separate pin which is inserted downward through aligned holes in the drawbar and clevis. In contrast ball and socket mechanisms and pintle hook and ring mechanisms comprise only an upward extending lower male hitch member, being the pintle hook or ball, that is attached to the towing vehicle, and a female hitch member, the ring or socket, that is attached to the trailer tongue and drops over and engages the male hitch member make the connection. No separate connecting pin is required. A lock mechanism prevents the male and female members from disengaging.

A typical pintle hook and ring hitch has a base for attachment to the towing vehicle and a hook like lower jaw curving rearward and upward from the base to form the pintle hook, and an upper jaw pivotally attached to base. To connect a towed vehicle, the upper jaw is raised and latched into the open position creating a gap between the top of the pintle hook and the upper jaw. The towing vehicle is moved rearward and the ring on the tongue of the towed vehicle moves through the gap and then the tongue is lowered so that the ring drops over the pintle hook and rests on the bottom of the lower jaw. The upper jaw is then pivoted downward to a closed position where the outer end of the upper jaw is close to the upper end of the pintle hook. The upper jaw closes the gap preventing the ring from disengaging from the pintle hook, and thus locks the ring to the pintle hook.

The upper jaw typically includes a latch mechanism to latch it in either the open or closed positions, and a safety pin is typically required to lock the upper jaw in the closed position in case the latch fails. Such a pintle hook and ring hitch is described for example in U.S. Pat. No. 5,332,250 to Thorwall et al.

In ball and socket hitches the socket mechanism on the trailer tongue typically includes some manner of clamp mechanism that engages the bottom surface of the ball to prevent the socket from moving upward out of engagement with the ball.

U.S. Pat. No. 3,963,266 discloses a combination hitch apparatus with a ball on the lower male hitch member extending up from the lower jaw. The ring on a trailer tongue can drop over the ball to rest on the lower jaw, or a socket on a trailer tongue can drop onto the ball. The upper jaw moves down to closed position where the outer end of the upper jaw is close to the upper end of the ball to close the gap between the upper and lower jaws to prevent a ring from disengaging the lower male hitch member. U.S. Pat. No. 6,139,043 to Gries et al. and U.S. Pat. No. 5,312,128 to Blacklaw, and U.S. Pat. No. 4,844,498 to Kerins et al. also disclose combination hitch apparatus for use with either a ring or socket type trailer tongue.

Canadian Patent Number 2,779,051 to Olson discloses a clevis and tongue hitch mechanism with a drawpin retainer apparatus comprising a retainer key pivotally attached above the drawpin to prevent the drawpin from moving up out of engagement with the hitch.

SUMMARY OF THE INVENTION

The present disclosure provides a ring latch for a pintle hitch apparatus that overcomes problems in the prior art.

In a first embodiment the present disclosure provides a pintle hitch apparatus for attachment to a towing vehicle and for releasable engagement with a hitch ring member attached to a towed vehicle. The apparatus comprises a base adapted at a forward end thereof for attachment to the towing vehicle. A hook member is attached to a rear end of the base and forms a cradle between the base and an upward oriented male portion of the hook member, the cradle configured to support the hitch ring member in a ring location. A latch member is pivotally attached to the base about a substantially horizontal pivot axis such that the latch member can pivot from a closed position, where a rear portion of the latch member extends over the cradle above the ring location, to an open position where the rear end of the latch member is forward of the cradle, and the latch member is weighted such that the latch member falls to the closed position when the latch member is in a pivot range between the closed position and an balanced position.

In a second embodiment the present disclosure provides a hitch apparatus for connecting a towed vehicle to a towing vehicle. The apparatus comprises a hitch ring member adapted at a rearward end thereof for attachment to the towed vehicle such that an axis of a ring aperture defined by the hitch ring member is oriented substantially vertically. A pintle hitch member comprises a base adapted at a forward end thereof for attachment to the towing vehicle, and a hook member attached to a rear end of the base and forming a cradle between the base and an upward oriented male portion of the hook member, the cradle configured to support the hitch ring member in a ring location. A latch member is pivotally attached to the base about a substantially horizontal pivot axis such that the latch member can pivot from a closed position, where a rear portion of the latch member extends over the cradle above the hitch ring member in the ring location, to an open position where the rear end of the latch member is forward of the cradle. The latch member is weighted such that the latch member falls to the closed position when the latch member is in the open position.

The pintle hitch apparatus securely latches the hitch ring member into engagement with the pintle hitch apparatus simply by dropping the hitch ring member over the male portion of the hook member of the pintle hitch apparatus. The latch member pivots forward to allow the ring of the hitch ring member to enter the cradle, and then swings back to the closed position automatically to secure the ring in the cradle. The ring is released simply by flipping the latch member up and over to the release position and raising the ring above the male portion of the hook member, which in turn moves the latch member back to the closed position.

DESCRIPTION OF THE DRAWINGS

While the invention is claimed in the concluding portions hereof, preferred embodiments are provided in the accompanying detailed description which may be best understood in conjunction with the accompanying diagrams where like parts in each of the several diagrams are labeled with like numbers, and where:

DETAILED DESCRIPTION OF THE ILLUSTRATED EMBODIMENTS

Figure 1:
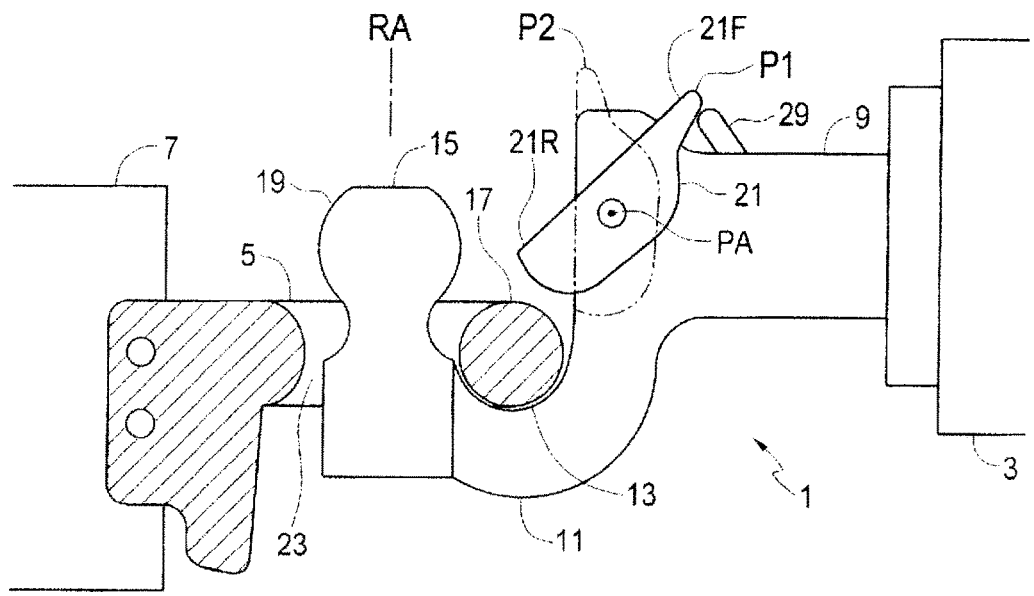
FIG. 1 is a schematic cut-away side view of an embodiment of a pintle hitch apparatus of the present disclosure with a ring resting the cradle thereof and with the latch member shown in the closed position, and in phantom lines in the open position.
Figure 2:
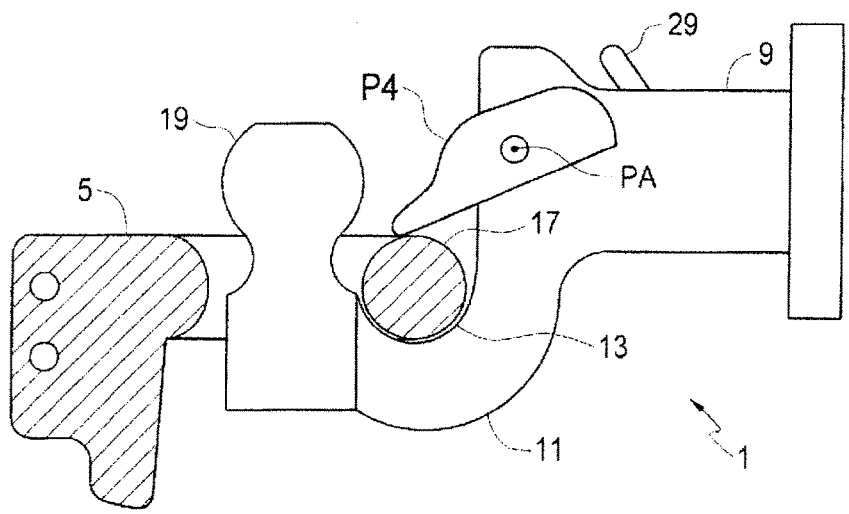
FIG. 2 is a schematic cut-away side view of the embodiment of FIG. 1 with a ring resting the cradle thereof and with the latch member shown in the release position.
Figure 3:
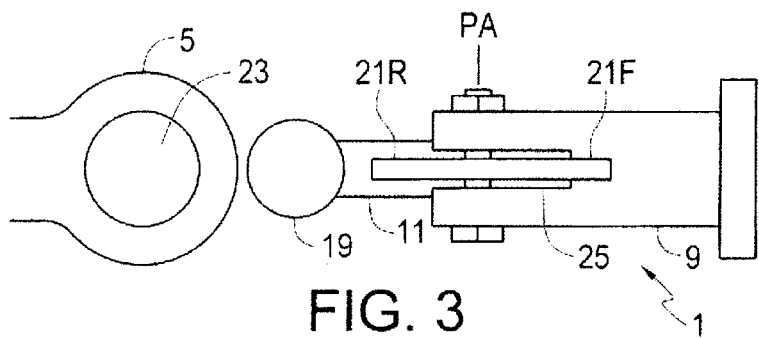
FIG. 3 is a schematic top view of the embodiment of FIG. 1 with a hitch ring member just rearward of the trailer ball.

FIGS. 1-3 schematically illustrate an embodiment of a pintle hitch apparatus 1 of the present disclosure for attachment to a towing vehicle 3 and for releasable engagement with a hitch ring member 5 attached to a towed vehicle 7. The apparatus 1 comprises a base 9 adapted at a forward end thereof for attachment to the towing vehicle 3. A hook member 11 is attached to a rear end of the base 9 and forms a cradle 13 between the base 9 and an upward oriented male portion 15 of the hook member 11. The cradle 13 is configured to support the hitch ring member 5 in a ring location 17 as shown in FIG. 1.

The male portion 15 of the hook member 11 could be a simple vertical shaft however in the illustrated apparatus 1, a trailer ball 19 is defined on a top end of the male portion 15 of the hook member 11 to allow for convenient attachment of a socket type trailer hitch to the apparatus 1, as well as the hitch ring member 5.

A latch member 21 is pivotally attached to the base 9 about a substantially horizontal pivot axis PA such that the latch member 21 can pivot from a closed position P1 shown in FIG. 1, where a rear portion 21R of the latch member 21 extends over the cradle 13 above the ring location 17, to an open position P2 shown in FIG. 1 in phantom lines, where the rear end 21R of the latch member 21 is forward of the cradle 13.

Figure 5:
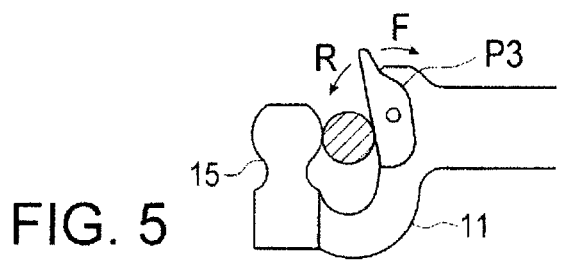
FIG. 5 is a schematic cut-away side view of the embodiment of FIG. 1 with the latch member in the balanced position.

The latch member 21 is weighted such that the latch member 21 falls to the closed position P1 when the latch member is in a pivot range between the closed position P1 and a balanced position P3 illustrated in FIG. 5, and such that when the latch member 21 is in the pivot range between the balanced position P3 and a release position P4 illustrated in FIG. 2, the latch member 21 falls to the release position P4.

Figure 4:
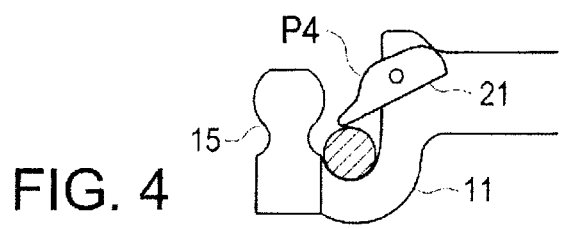
FIG. 4 is a schematic cut-away side view of the embodiment of FIG. 1 with the latch member in the release position.
Figure 6:
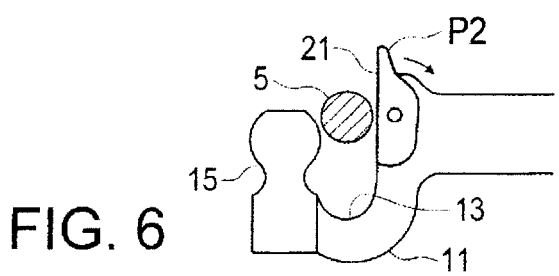
FIG. 6 is a schematic cut-away side view of the embodiment of FIG. 1 with the latch member in the open position.
Figure 7:
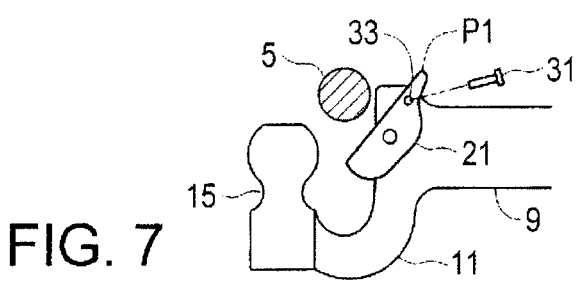
FIG. 7 is a schematic cut-away side view of the embodiment of FIG. 1 with the latch member in the closed position.

The pivot range is illustrated schematically in FIGS. 4-7 and extends from the closed position P1 shown in FIG. 7 through the open position P2 shown in FIG. 6 and through the balanced position P3 shown in FIG. 5 to a release position P4 shown in FIG. 4 where a front portion 21F of the latch member 21 is above the cradle 13 and ring location 17. In the balanced position P3 of FIG. 5, the latch member 21 is balanced so that any slight movement in the forward F will cause it to fall to the closed position P1 while a movement in the rearward direction R will cause it to fall to the release position P4.

Figure 8:
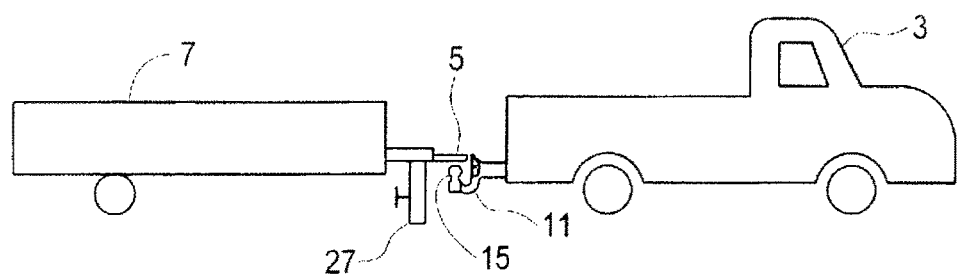
FIG. 8 is a schematic side view of a towing vehicle in position with respect to a towed vehicle such that the hitch ring member may be lowered into engagement with the pintle hitch apparatus.

The hitch ring member 5 defines a ring aperture 23 and is mounted to the towed vehicle 7 such that the axis RA of the ring aperture 23 is oriented substantially vertically. In operation the towing vehicle 3 is maneuvered with respect to the towed vehicle 7 such that the ring aperture 23 is above and aligned with the male portion 15 of the hook member 11 as schematically illustrated in FIG. 8. The hitch ring member 5 is then lowered with the jack 27 such that the male portion 15 of the hook member 11 enters the ring aperture 23 as seen in FIG. 1 and the hitch ring member 5 moves downward toward the cradle 13 and contacts the rear end 21R of the latch member 21, moving the latch member 21 forward to the open position P2, and the hitch ring member 5 then moves downward into the cradle 13 and the latch member 21, because of its weighting, moves rearward into the closed position P1 preventing upward movement of the hitch ring member 5 out of the cradle 13.

It is contemplated that, if the latch member simply hung in the closed position P1, moving the hitch ring member 5 upward would cause the latch member 21 to jam, preventing upward movement. In the illustrated apparatus 1, the rear end 21R of the latch member 21 is prevented from moving upward away from the closed position P1 because the front portion 21F bears against the end of the slot 25 that the latch member 21 hangs in, as seen in the top view of FIG. 3, and is prevented from moving farther forward which in turn prevents the rear end 21R from moving up and allowing the hitch ring member 5 to move out of the cradle 13. A stop 29, such as schematically illustrated in FIG. 1 could also be provided to prevent forward movement of the latch member 21 out of the closed position P1.

The hitch ring member 5 is released by pivoting the latch member from the closed position P1 to the release position P4 shown in FIGS. 2 and 4. In the illustrated apparatus 1 the front portion 21F of the latch member 21 rests on top of the hitch ring member 5. The hitch ring member 5 is then raised out of the cradle 13 moving the latch member 21 to the balanced position of FIG. 5, and then as the ring moves farther upward above the trailer ball 19 on the top end of the male portion 15 of the hook member 11, the latch member 21 is moved past the balanced position P3 to the position of FIG. 6 where the weighting causes the latch member 21 to fall to the closed position P1 of FIG. 7.

A safety lock can be provided to releasably lock the latch member 21 in the closed position P1 to prevent the latch member 21 from being jarred out of the closed position to the release position during travel on rough terrain. FIG. 7 schematically illustrates a safety lock comprising a safety pin 31 extending through corresponding holes 33 in the latch member 21 and the base 9. It is contemplated that transport regulations may require such a safety lock which is readily provided.

The present disclosure provides a convenient pintle hitch apparatus 1 that securely latches a hitch ring member 5 into engagement with the male portion 15 of the hook member 11 simply by dropping the hitch ring member 5 over the male portion 15. The latch member 21 pivots to allow the ring of the hitch ring member 5 to enter the cradle 13, and then swings back to the closed position automatically to secure the ring in the cradle 13. To release the ring the latch member 21 is simply flipped over to the release position P4 and the ring can be raised out of engagement. Raising the hitch ring member 5 automatically resets the latch member 21 so same is ready for the next connection.

The foregoing is considered as illustrative only of the principles of the invention. Further, since numerous changes and modifications will readily occur to those skilled in the art, it is not desired to limit the invention to the exact construction and operation shown and described, and accordingly, all such suitable changes or modifications in structure or operation which may be resorted to are intended to fall within the scope of the claimed invention.

What is claimed is:

1. A pintle hitch apparatus for attachment to a towing vehicle and for releasable engagement with a hitch ring member attached to a towed vehicle, the apparatus comprising:
   a base adapted at a forward end for attachment to the towing vehicle;
   a hook member attached to a rear end of the base and forming a cradle between the base and an upward oriented male portion of the hook member, the cradle configured to support the hitch ring member in a ring location;
   a latch member pivotally attached to the base about a substantially horizontal pivot axis such that the latch member can pivot from a closed position, where a rear portion of the latch member extends over the cradle above the ring location, to an open position where the rear portion of the latch member is forward of the cradle; and
   wherein the latch member is weighted such that the latch member falls to the closed position when the latch member is in the open position;
   wherein the latch member pivots in a pivot range extending from the closed position through the open position and through a balanced position to a release position where a front portion of the latch member is above the cradle, and wherein the latch member is weighted such that when the latch member is in the pivot range between the balanced position and the closed position the latch member falls to the closed position, and when the latch member is in the pivot range between the balanced position and the release position the latch member falls to the release position.

2. The apparatus of claim 1 where in operation the towing vehicle is maneuvered such that a ring aperture defined by the hitch ring member is above and aligned with the male portion of the hook member and then lowered such that the male portion of the hook member enters the ring aperture and the hitch ring member moves downward toward the cradle and contacts the latch member, moving the latch member forward to the open position, and the hitch ring member then moves downward into the cradle and the latch member moves rearward into the closed position preventing upward movement of the hitch ring member out of the cradle.

3. The apparatus of claim 2 where further in operation the hitch ring member is released by pivoting the latch member from the closed position to the release position such that a front portion of the latch member is above the ring location, and the hitch ring member is raised such that the hitch ring member is above a top end of the male portion of the hook member, the hitch ring member raising the front portion of the latch member and pivoting the latch member from the release position past the balanced position such that the latch member moves to the closed position.

4. The apparatus of claim 1 wherein a front portion of the latch member bears against the base when in the latch member is in the closed position.

5. The apparatus of claim 1 further comprising a safety lock operative to releasably lock the latch member in the closed position.

6. The apparatus of claim 5 wherein the safety lock comprises a safety pin extending through corresponding holes in the latch member and the base.

7. The apparatus of claim 1 wherein a trailer ball is defined on a top end of the male portion of the hook member.

8. A hitch apparatus for connecting a towed vehicle to a towing vehicle, the apparatus comprising:
   a hitch ring member adapted at a rearward end for attachment to the towed vehicle such that an axis of a ring aperture defined by the hitch ring member is oriented substantially vertically;
   a pintle hitch member comprising a base adapted at a forward end for attachment to the towing vehicle, and a hook member attached to a rear end of the base and forming a cradle between the base and an upward oriented male portion of the hook member, the cradle configured to support the hitch ring member in a ring location;
   a latch member pivotally attached to the base about a substantially horizontal pivot axis such that the latch member can pivot from a closed position, where a rear portion of the latch member extends over the cradle above the hitch ring member in the ring location, to an open position where the rear portion of the latch member is forward of the cradle;
   wherein the latch member is weighted such that the latch member falls to the closed position when the latch member is in the open position;
   wherein the latch member pivots in a pivot range extending from the closed position through the open position and through a balanced position to a release position where a front portion of the latch member is above the cradle, and wherein the latch member is weighted such that when the latch member is in the pivot range between the balanced position and the closed position the latch member falls to the closed position, and when the latch member is in the pivot range between the balanced position and the release position the latch member falls to the release position.

9. The apparatus of claim 8 where in operation the towing vehicle is maneuvered such that the ring aperture is above and aligned with the male portion of the hook member and then lowered such that the male portion of the hook member enters the ring aperture and the hitch ring member moves downward toward the cradle and contacts the latch member, moving the latch member forward to the open position, and the hitch ring member then moves downward into the cradle and the latch member moves rearward into the closed position preventing upward movement of the hitch ring member out of the cradle.

10. The apparatus of claim 9 where further in operation the hitch ring member is released by pivoting the latch member from the closed position to the release position, and the hitch ring member is raised such that the hitch ring member is above a top end of the male portion of the hook member, the hitch ring member raising the front portion of the latch member and pivoting the latch member from the release position past the balanced position such that the latch member moves to the closed position.

11. The apparatus of claim 9 wherein a front portion of the latch member bears against the base when in the latch member is in the closed position.

12. The apparatus of claim 10 further comprising a safety lock operative to releasably lock the latch member in the closed position.

13. The apparatus of claim 12 wherein the safety lock comprises a safety pin extending through corresponding holes in the latch member and the base.

14. The apparatus of claim 11 wherein a trailer ball is defined on a top end of the male portion of the hook member.

* * * * *